US011953847B2

(12) United States Patent
Ibaragi

(10) Patent No.: US 11,953,847 B2
(45) Date of Patent: Apr. 9, 2024

(54) TRANSFER UNIT AND IMAGE FORMING APPARATUS THEREWITH

(71) Applicant: KYOCERA Document Solutions Inc., Osaka (JP)

(72) Inventor: Hiromu Ibaragi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/167,652

(22) Filed: Feb. 10, 2023

(65) Prior Publication Data

US 2023/0259054 A1 Aug. 17, 2023

(30) Foreign Application Priority Data

Feb. 17, 2022 (JP) ................................ 2022-022745

(51) Int. Cl.
*G03G 15/16* (2006.01)

(52) U.S. Cl.
CPC ................................ *G03G 15/1615* (2013.01)

(58) Field of Classification Search
CPC ........... G03G 15/1605; G03G 15/1615; G03G 15/1645; G03G 15/1665; G03G 15/167
See application file for complete search history.

(56) References Cited

U.S. PATENT DOCUMENTS 11,520,256 B2 * 12/2022 Yamada ............ G03G 15/1685
11,714,367 B2 * 8/2023 Takagi .............. G03G 15/1685 399/302
2017/0255133 A1 9/2017 Kubota et al.
2023/0044638 A1 * 2/2023 Hanamoto ......... G03G 15/0136

FOREIGN PATENT DOCUMENTS

JP 2017-156653 A 9/2017

* cited by examiner

*Primary Examiner* — Hoang X Ngo
(74) *Attorney, Agent, or Firm* — Stein IP, LLC

(57) ABSTRACT

A transfer unit includes a first and a second roller differing in one of the axial length, volume resistivity, and hardness of their elastic layer, a first and a second bearing members rotatably supporting the metal shafts of the first and second rollers, a roller holder, and a switching mechanism. The roller holder has a first and a second bearing holding portion that hold the first and second bearing members slidably. The switching mechanism drives the roller holder to rotate such that one of the first and second rollers is arranged at a reference position at which the first or second roller is kept in pressed contact with an image carrying member to form a transfer nip. The first and second bearing members have grounding member that ground the first and second rollers respectively.

8 Claims, 12 Drawing Sheets

TRANSFER UNIT AND IMAGE FORMING APPARATUS THEREWITH

INCORPORATION BY REFERENCE

This application is based upon and claims the benefit of priority from the corresponding Japanese Patent Application No. 2022-022745 filed on Feb. 17, 2022, the entire contents of which are hereby incorporated by reference.

BACKGROUND

The present disclosure relates to a transfer unit for transferring to a recording medium a toner image formed on an image carrying member such as a photosensitive drum or an intermediate transfer belt. The present disclosure also relates to an image forming apparatus incorporating such a transfer unit. The present disclosure particularly relates to a mechanism for grounding a transfer member.

There is conventionally known an intermediate transfer-type image forming apparatus including an endless intermediate transfer belt that is rotated in a prescribed direction and a plurality of image forming portions provided along the intermediate transfer belt. In this image forming apparatus, by the image forming portions, toner images of different colors are primarily transferred to the intermediate transfer belt so as to be sequentially superimposed on each other, and then the toner images are secondarily transferred by a secondary transfer roller to a recording medium such as paper.

In such intermediate transfer-type image forming apparatuses, toner progressively adheres to the surface of the secondary transfer roller as durable printing goes on. In particular, to improve color rendition and color reproduction, it is necessary to perform calibration for correcting image density and color displacement with predetermined timing. At this time, a patch image formed on the intermediate transfer belt during calibration is, instead of being transferred to a sheet, removed by a belt cleaning device. This causes, as the patch image passes across the secondary transfer roller, part of the toner transferred to the intermediate transfer belt to adhere to the secondary transfer roller.

Conventionally, the secondary transfer roller is cleaned by application of a reverse transfer voltage (a voltage with the same polarity as the toner) to the secondary transfer roller during a non-image forming period to move the toner deposited on the secondary transfer roller back to the intermediate transfer belt. However, this method is disadvantageous in that it takes time to clean the secondary transfer roller, resulting in a longer printing wait time.

SUMMARY

According to one aspect of the present disclosure, a transfer unit includes a transfer roller that has a metal shaft and an elastic layer laid around the circumferential face of the metal shaft and that forms a transfer nip by keeping the elastic layer in pressed contact with an image carrying member. A toner image formed on the image carrying member is transferred to a recording medium as it passes through the transfer nip. The transfer unit includes, a first roller and a second roller as the transfer roller, a first bearing member, a second bearing member, a roller holder, and a switching mechanism. The first and second rollers differ in one of the axial length, volume resistivity, and hardness of their elastic layer. The first and second bearing members rotatably support the metal shafts of the first and second rollers respectively. The roller holder has a first and a second bearing holding portion that respectively hold the first and second bearing members slidably in directions toward and away from the image carrying member. The switching mechanism drives the roller holder to rotate such that one of the first and second rollers is arranged at a reference position at which the first or second roller is kept in pressed contact with the image carrying member to form the transfer nip. The first and second bearing members have grounding members that grounds the first and second rollers respectively.

DETAILED DESCRIPTION

Figure 1:
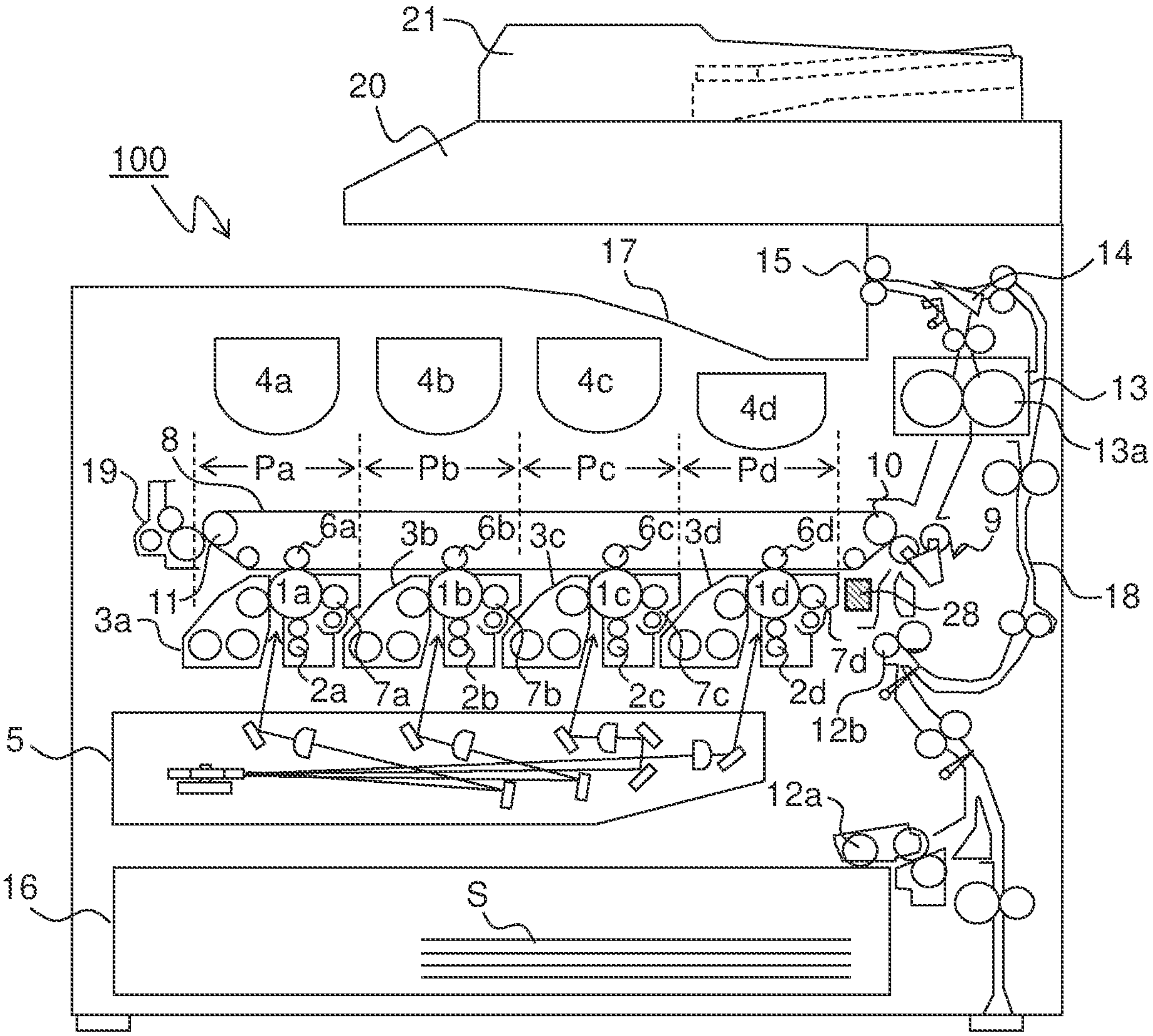
FIG. 1 is a schematic diagram showing an internal configuration of an image forming apparatus including a secondary transfer unit according to the present disclosure.
Figure 2:
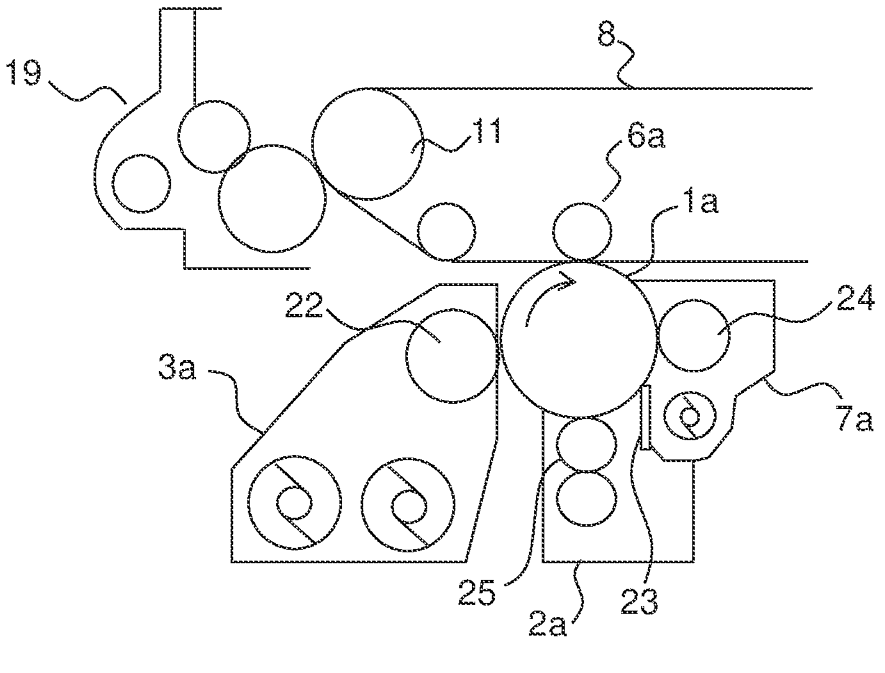
FIG. 2 is an enlarged view of and around an image forming portion in FIG. 1.

Hereinafter, with reference to the accompanying drawings, embodiments of the present disclosure will be described. FIG. 1 is a schematic diagram showing the configuration of an image forming apparatus 100 including a secondary transfer unit 9 according to the present disclosure, and FIG. 2 is an enlarged view of and around an image forming portion Pa in FIG. 1.

The image forming apparatus 100 shown in FIG. 1 is what is called a tandem-type color multifunction peripheral and is configured as follows. In the main body of the image forming apparatus 100, four image forming portions Pa, Pb, Pc and Pd are arranged in this order from upstream in the conveying direction (from the left side in FIG. 1). The image forming portions Pa to Pd are provided so as to correspond to images of four different colors (magenta, cyan, yellow, and black) and sequentially form images of magenta, cyan, yellow, and black, respectively, by following the steps of electrostatic charging, exposure to light, development, and transfer. On the top part of the main body of the image forming apparatus 100, an image reading portion 20 is arranged. The image forming portion 20 is fitted with an automatic document conveyance device (auto document feeder).

In these image forming portions Pa to Pd, photosensitive drums 1*a*, 1*b*, 1*c*, and 1*d* are respectively arranged which carry visible images (toner images) of the different colors. Furthermore, an intermediate transfer belt 8 which rotates counter-clockwise in FIG. 1 is provided adjacent to the image forming portions Pa to Pd. The toner images formed on the photosensitive drums 1*a* to 1*d* are transferred sequentially to the intermediate transfer belt 8 that moves while keeping contact with the photosensitive drums 1*a* to 1*d* and are then, in the secondary transfer unit 9, transferred at once to a sheet S, which is one example of a recording medium. Then, after the toner images are fixed to the sheet S in a fixing portion 13, the sheet is discharged from the main body of the image forming apparatus 100. An image forming process is performed with respect to the photosensitive drums 1*a* to 1*d* while they are rotated clockwise in FIG. 1.

The sheet S to which the toner images are transferred is stored in a sheet cassette 16 arranged in a lower part of the main body of the image forming apparatus 100, and is conveyed via a sheet feeding roller 12*a* and a pair of registration rollers 12*b* to the secondary transfer unit 9. Used typically as the intermediate transfer belt 8 is a belt without seams (seamless belt).

Next, a description will be given of the image forming portions Pa to Pd. The image forming portion Pa will be described in detail below. Since the image forming portions Pb to Pd have basically similar structures, no overlapping description will be repeated. As shown in FIG. 2, around the photosensitive drum 1*a*, there are arranged, in the drum rotation direction (clockwise in FIG. 2), a charging device 2*a*, a developing device 3*a*, a cleaning device 7*a*, and, across the intermediate transfer belt 8, a primary transfer roller 6*a*. In addition, upstream in the rotation direction of the intermediate transfer belt 8 with respect to the photosensitive drum 1*a*, a belt cleaning unit 19 is arranged so as to face a tension roller 11 across the intermediate transfer belt 8.

Next, a description will be given of an image forming procedure on the image forming apparatus 100. When a user enters an instruction to start image formation, first, a main motor 60 (see FIG. 11) starts rotating the photosensitive drums 1*a* to 1*d*, and charging rollers 25 in the charging devices 2*a* to 2*d* electrostatically charge the surfaces of the photosensitive drums 1*a* to 1*d* uniformly. Next, an exposure device 5 irradiates the surfaces of the photosensitive drums 1*a* to 1*d* with a beam of light (laser light). In this way, electrostatic latent images reflecting an image signal are formed on the photosensitive drums 1*a* to 1*d*. The image signal is acquired by reading a document image with the image forming portion 20 or is transmitted from an external device such as a personal computer or the like via an image input portion 70 (see FIG. 11).

The developing devices 3*a* to 3*d* are loaded with predetermined amounts of toner of magenta, cyan, yellow, and black respectively. When, through formation of toner images, which will be described later, the proportion of toner in a two-component developer stored in the developing devices 3*a* to 3*d* falls below a determined value, toner is supplied from toner containers 4*a* to 4*d* to the developing devices 3*a* to 3*d* respectively. The toner in the developer is fed from developing rollers 22 in the developing devices 3*a* to 3*d* to the photosensitive drums 1*a* to 1*d* respectively, and electrostatically attaches to them. In this way, toner images corresponding to the electrostatic latent images formed through exposure to light from the exposure device 5 are formed.

Then, the primary transfer rollers 6*a* to 6*d* apply electric fields of a prescribed transfer voltage between themselves and the photosensitive drums 1*a* to 1*d*, and thus the toner images of magenta, cyan, yellow, and black respectively on the photosensitive drums 1*a* to 1*d* are primarily transferred to the intermediate transfer belt 8. These images of four colors are formed in a predetermined positional relationship with each other that is prescribed for formation of a predetermined full-color image. After that, in preparation for the subsequent formation of new electrostatic latent images, the residual toner remaining on the surfaces of the photosensitive drums 1*a* to 1*d* is removed by cleaning blades 23 and rubbing rollers 24 in the cleaning devices 7*a* to 7*d*.

As a driving roller 10 is driven to rotate by a belt drive motor 61 (see FIG. 11), the intermediate transfer belt 8 starts to rotate counter-clockwise. Next, the sheet S is conveyed with predetermined timing from the pair of registration rollers 12*b* to the secondary transfer unit 9 provided adjacent to the intermediate transfer belt 8, where the full-color image is transferred to it. The sheet S to which the toner images have been transferred is conveyed to the fixing portion 13. The toner remaining on the surface of the intermediate transfer belt 8 is removed by the belt cleaning unit 19.

The sheet S conveyed to the fixing portion 13 is heated and pressed by a pair of fixing rollers 13*a* so that the toner images are fixed to the surface of the sheet S, and thus the prescribed full-color image is formed on it. The conveyance direction of the sheet S on which the full-color image has been formed is switched by a branch portion 14 branching into a plurality of directions, and thus the sheet S is directly (or after being conveyed to a double-sided conveyance path 18 and thus being subjected to double-sided printing) discharged onto a discharge tray 17 by a pair of discharge rollers 15.

An image density sensor 28 is arranged at a position opposite the driving roller 10 via the intermediate transfer belt 8. As the image density sensor 28, an optical sensor is typically used that includes a light-emitting element such as an LED and a light-receiving element such as a photodiode. To measure the amount of toner attached to the intermediate transfer belt 8, patch images (reference images) formed on the intermediate transfer belt 8 are irradiated with measurement light from the light-emitting element. The measurement light strikes the light-receiving element as light reflected by the toner and light reflected by the belt surface.

The light reflected from the toner and the belt surface includes a regularly reflected light component and an irregularly reflected light component. The regularly and irregularly reflected light are separated with a polarization splitting prism and strike separate light-receiving elements respectively. Each of the light-receiving elements performs photoelectric conversion on the received regularly or irregularly reflected light and outputs an output signal to the control portion 90 (see FIG. 11).

Then, from the change in the characteristics of the output signals with respect to the regularly and irregularly reflected light, the image density (toner amount) and the image position in the patch images are determined and compared with a predetermined reference density and a predetermined reference position to adjust the characteristic value of the developing voltage, the start position and the start timing of exposure by the exposure device 5, and so on. In this way, for each of the different colors, density correction and color displacement correction (calibration) are performed.

Figure 3:
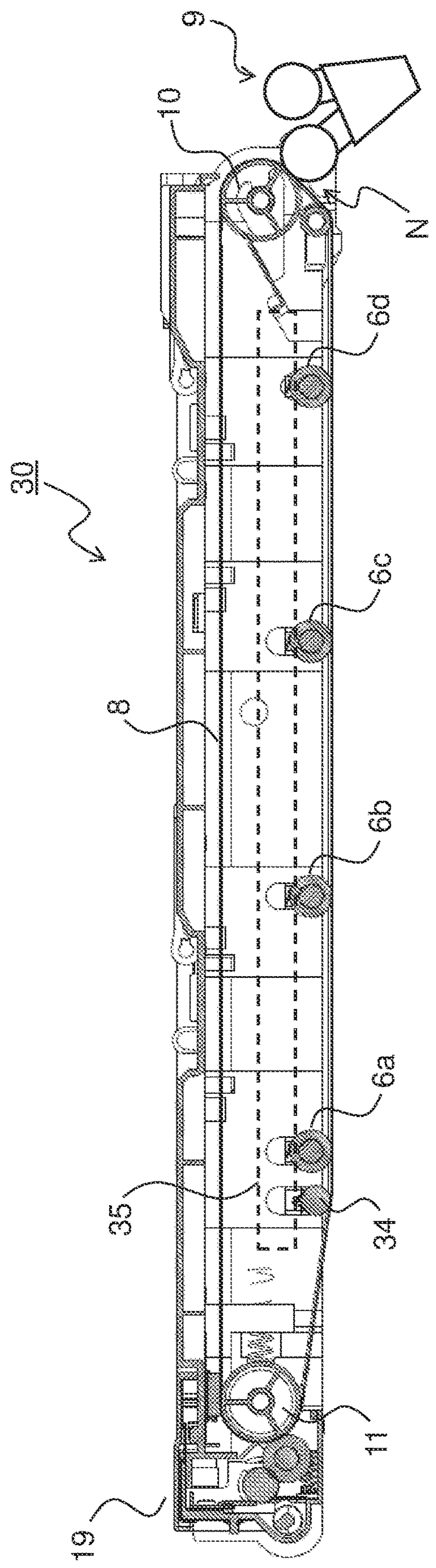
FIG. 3 is a side sectional view of an intermediate transfer unit mounted in the image forming apparatus.

FIG. 3 is a side sectional view of an intermediate transfer unit 30 incorporated in the image forming apparatus 100. As shown in FIG. 3, the intermediate transfer unit 30 includes the intermediate transfer belt 8 that is stretched between the driving roller 10 at the downstream side and the tension roller 11 at the upstream side, the primary transfer rollers 6*a* to 6*d* that are in contact with the photosensitive drums 1*a* to 1*d* via the intermediate transfer belt 8, and a pressing state switching roller 34.

The belt cleaning unit 19 for removing the residual toner remaining on the surface of the intermediate transfer belt 8 is arranged at a position opposite the tension roller 11. With the driving roller 10, the secondary transfer unit 9 is arranged and kept in pressed contact via the intermediate transfer belt 8, forming a secondary transfer nip N. The detailed configuration of the secondary transfer unit 9 will be described later.

The intermediate transfer unit 30 includes a roller contact/release mechanism 35 including a pair of support members (not shown) that supports the opposite ends of the rotary shaft of each of the primary transfer rollers 6*a* to 6*d* and the pressing state switching roller 34 so that they are rotatable and movable perpendicularly (in the up-down direction in FIG. 3) with respect to the travel direction of the intermediate transfer belt 8, a driving means (not shown) for driving the primary transfer rollers 6*a* to 6*d* and the pressing state switching roller 34 to reciprocate in the up-down direction. The roller contact/release mechanism 35 permits switching among a color mode in which the four primary transfer rollers 6*a* to 6*d* are in pressed contact with the photosensitive drums 1*a* to 1*d* (see FIG. 1), respectively, via the intermediate transfer belt 8, a monochrome mode in which only the primary transfer roller 6*d* is in pressed contact with the photosensitive drum 1*d* via the intermediate transfer belt 8, and a release mode in which the four primary transfer rollers 6*a* to 6*d* are all released from the photosensitive drums 1*a* to 1*d*, respectively.

Figure 4:
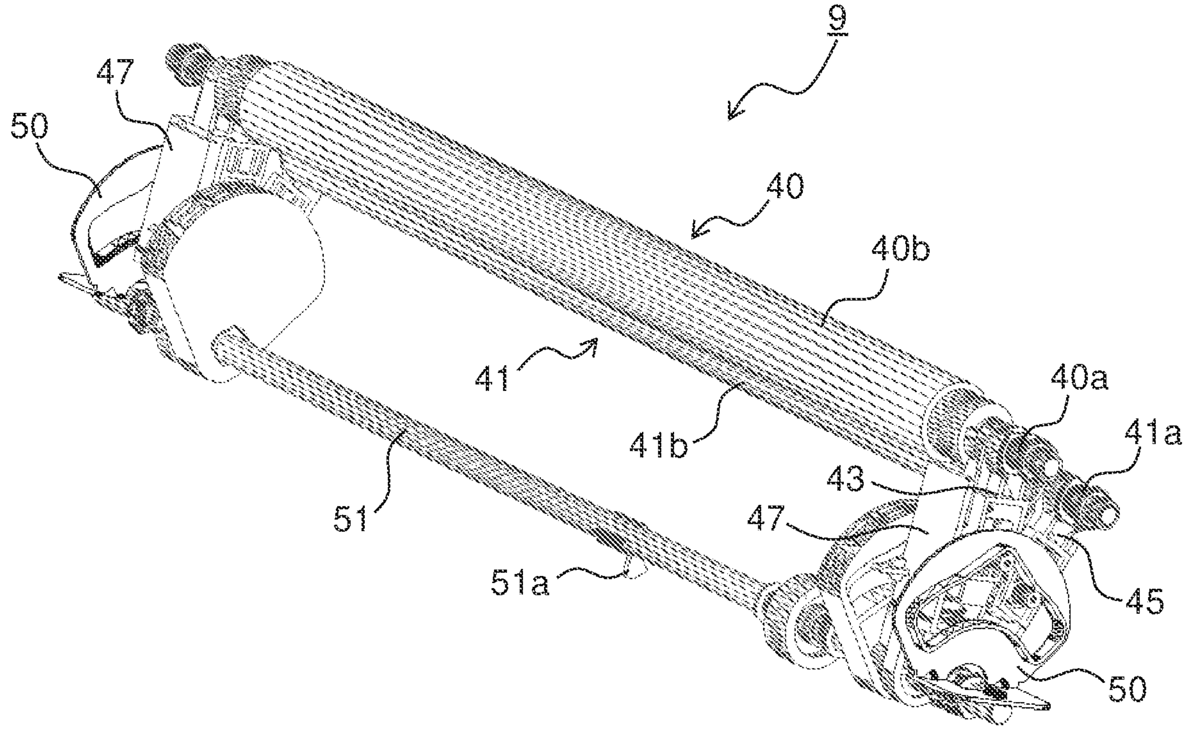
FIG. 4 is a perspective view of a secondary transfer unit according to one embodiment of the present disclosure incorporated in the image forming apparatus.
Figure 5:
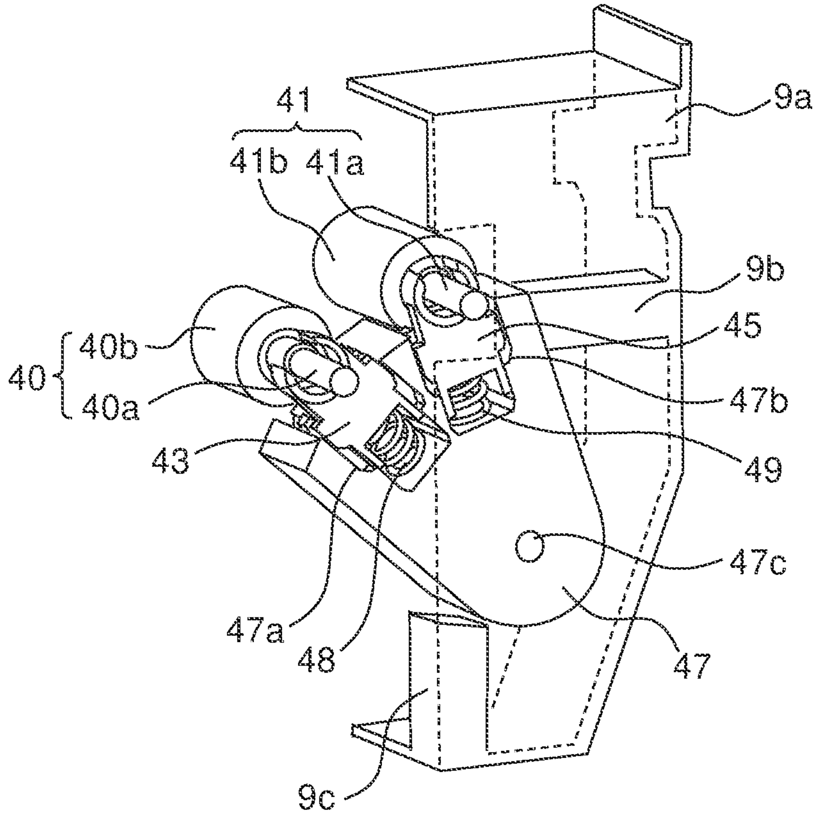
FIG. 5 is an enlarged perspective view illustrating the configuration of the secondary transfer unit according to the embodiment at one end.
Figure 6:
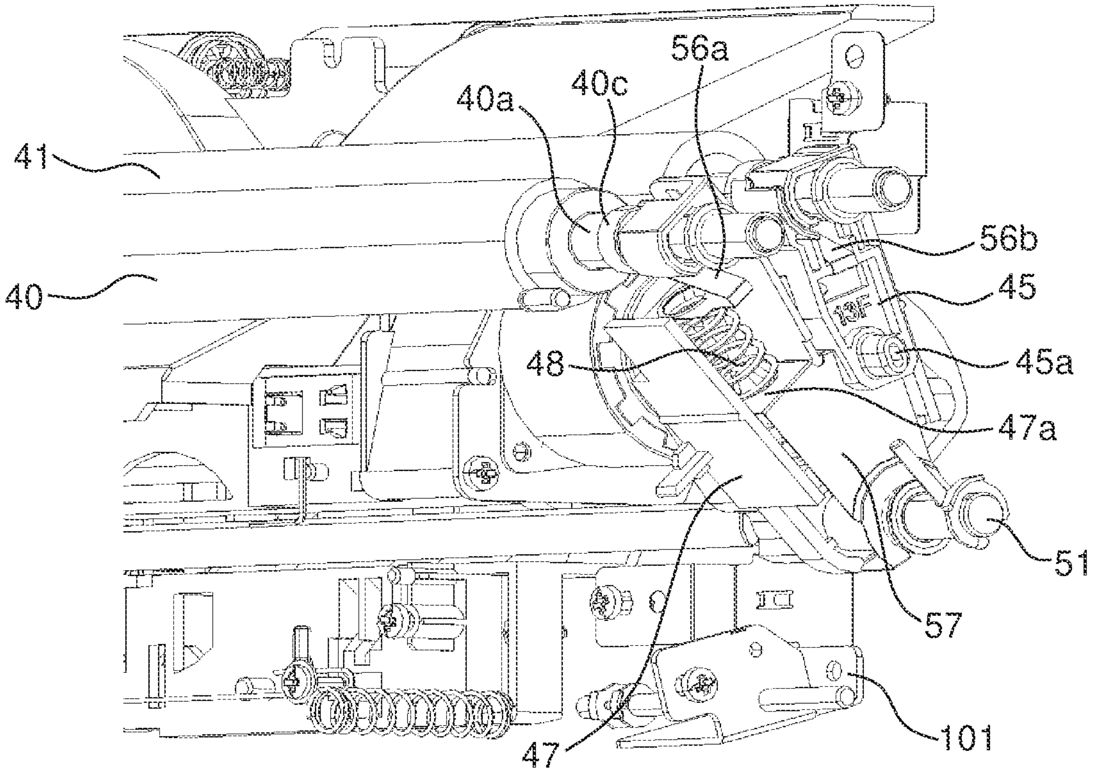
FIG. 6 is a perspective view of and around a roller holder in the secondary transfer unit according to the embodiment as seen from outward in the axial direction.
Figure 7:
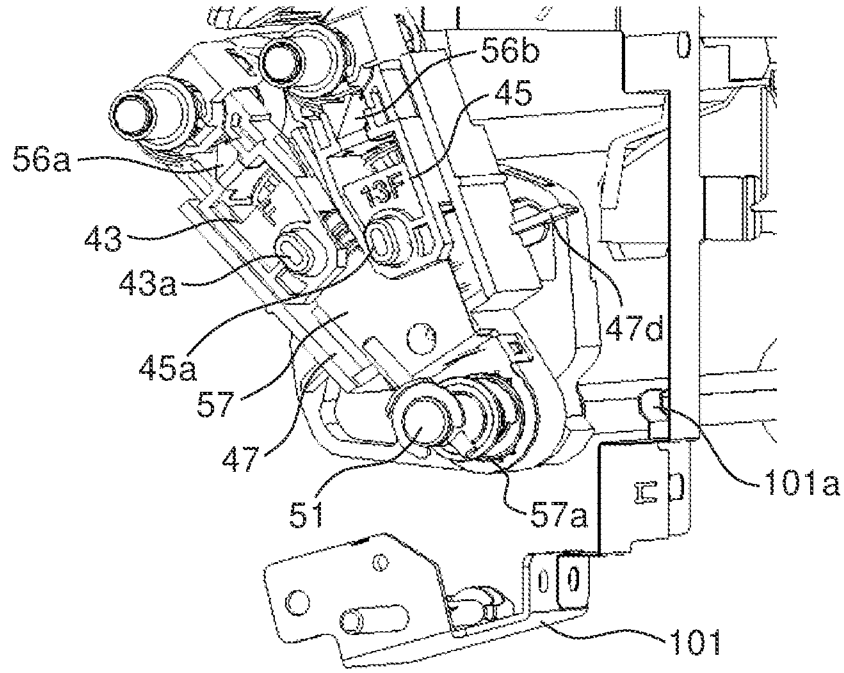
FIG. 7 is a perspective view of and around the roller holder in the secondary transfer unit as seen from in front, showing a shaft and a main body frame in contact with each other.
Figure 8:
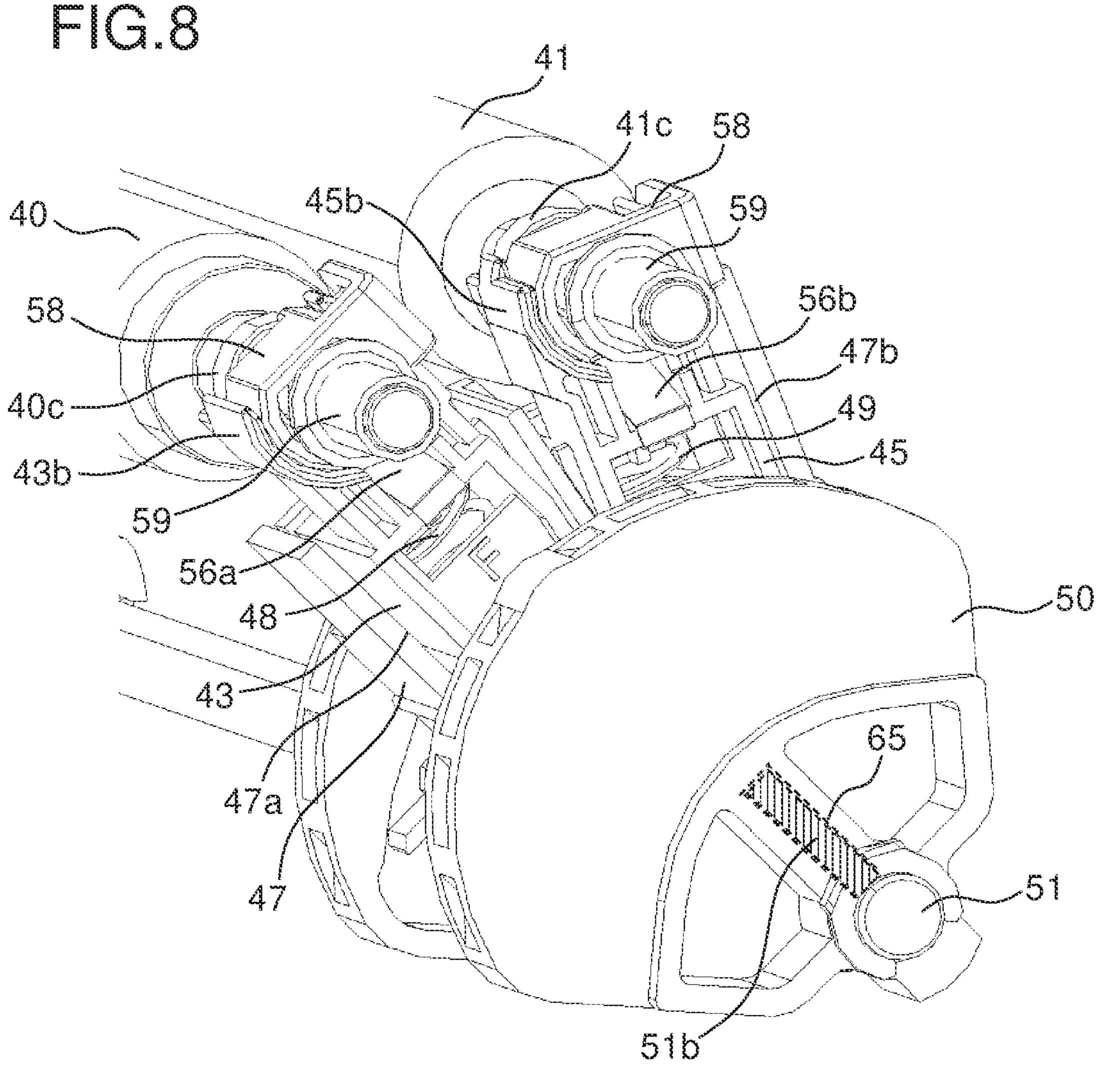
FIG. 8 is an enlarged perspective view of and around a first and a second bearing member in the secondary transfer unit as seen from outward in the axial direction.
Figure 9:
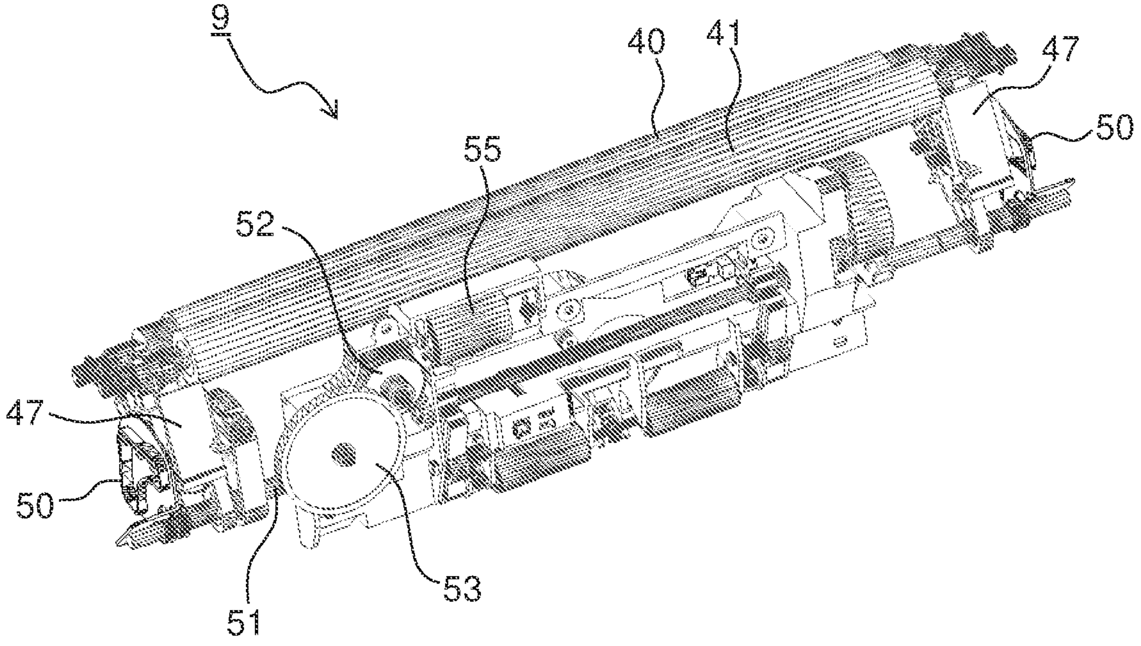
FIG. 9 is a perspective view illustrating the driving mechanism for the secondary transfer unit according to the embodiment.

FIG. 4 is a perspective view of a secondary transfer unit 9 according to an embodiment of the present disclosure incorporated in the image forming apparatus 100. FIG. 5 is an enlarged perspective view illustrating the configuration of the secondary transfer unit 9 according to the embodiment at one end. FIG. 6 is a perspective view of and around a roller holder 47 in the secondary transfer unit 9 according to the embodiment as seen from outward in the axial direction. FIG. 7 is a diagram showing a shaft 51 and a main body frame 101 in contact with each other. FIG. 8 is an enlarged perspective view of and around a first bearing member 43 and a second bearing member 45 in the secondary transfer unit 9 as seen from outward in the axial direction. FIG. 9 is a perspective view illustrating the driving mechanism for the secondary transfer unit 9 according to the embodiment. In FIGS. 4 and 9, a unit frame 9*a* is omitted from illustration. In FIG. 5, the unit frame 9*a* is illustrated with phantom lines. In FIG. 6, the first bearing member 43 and, in FIGS. 6 and 7, a switching cam 50 is omitted from illustration.

As shown in FIGS. 4 to 9, the secondary transfer unit 9 includes a first roller 40 and a second roller 41 as a secondary transfer roller, the first bearing member 43, the second bearing member 45, the roller holder 47, the switching cam 50, and a roller switching motor 55.

The first and second rollers 40 and 41 are elastic rollers respectively having electrically conductive elastic layers 40*b* and 41*b* laid around the outer circumferential faces of the metal shafts 40*a* and 41*a* respectively. Used as the material for the elastic layers 40*b* and 41*b* is, for example, ion conductive rubber such as ECO (epichlorohydrin rubber).

The elastic layer 40*b* of the first roller 40 is 311 millimeters long in the axial direction and is compatible with the A3-size sheet. The elastic layer 41*b* of the second roller 41 is longer than the elastic layer 40*b* of the first roller 40 in the axial direction. More specifically, the elastic layer 41*b* is 325 millimeters long in the axial direction and is compatible with the 13 inch-size sheet.

A pair of first bearing members 43 are arranged in opposite end parts of the first roller 40 in the axial direction so as to rotatably support the metal shaft 40*a*. A pair of second bearing members 45 are arranged in opposite end parts of the second roller 41 in the axial direction so as to rotatably support the metal shaft 41*a*.

A pair of roller holders 47 are arranged in opposite end parts of the first and second rollers 40 and 41 in the axial direction. The roller holder 47 is in a V-shape as seen in a side view and has a first bearing holding portion 47*a*, a second bearing holding portion 47*b*, and an insertion hole 47*c*. The first and second bearing holding portions 47*a* and 47*b* slidably support the first and second bearing members 43 and 45 respectively. The insertion hole 47*c* is formed near the vertex of the V-shape, and is rotatably penetrated by a shaft 51. The roller holder 47 is formed of an electrically insulating material such as synthetic resin.

As shown in FIG. 5, between the first bearing holding portion 47*a* and the first bearing member 43, a first coil spring 48 is arranged. Between the second bearing holding portion 47*b* and the second bearing member 45, a second coil spring 49 is arranged. The first and second rollers 40 and 41 are urged by the first and second coil springs 48 and 49 respectively in the direction away from the shaft 51 (a direction for pressed contact with the driving roller 10).

As shown in FIGS. 6 and 8, on the first and second bearing members 43 and 45, first grounding members 56*a* and 56*b* are arranged. The first grounding members 56*a* and 56*b* are formed by bending a metal plate into a predetermined shape.

Of the first grounding member 56*a*, one end is in contact with a metal bearing 40*c* attached to the metal shaft 40*a* in the first roller 40 and an other end part is in contact with an upper end part of the first coil spring 48. Of the first grounding member 56*b*, one end is in contact with a metal bearing 41*c* attached to the metal shaft 41*a* in the second roller 41 and an other end part is in contact with an upper end part of the second coil spring 49.

As shown in FIGS. 6 and 7, on the roller holder 47, a second grounding member 57 is arranged. The second grounding member 57 is formed by bending a metal plate into a predetermined shape. The second grounding member 57 is bent such that an upper end part of it overlaps with the bottom faces of the first and second bearing holding portions 47*a* and 47*b*, and is in contact with lower end parts of the first and second coil springs 48 and 49. In a lower end part of the second grounding member 57, a conduction hole 57*a* which is penetrated by the shaft 51 is formed. The inner diameter of the conduction hole 57*a* is equal to the outer diameter of the shaft 51 and the inner circumferential edge of the conduction hole 57*a* is in contact with the outer surface of the shaft 51.

As shown in FIG. 7, the outer surface of the shaft 51 is in contact with a contact piece 101*a* formed on the main body frame 101 of the image forming apparatus 100 and the shaft 51 is grounded (earthed) via the main body frame 101.

With this configuration, the first roller 40 is grounded (earthed) via the first grounding member 56*a*, the first coil spring 48, the second grounding member 57, the shaft 51, and the main body frame 101. The second roller 41 is grounded (earthed) via the first grounding member 56*b*, the second coil spring 49, the second grounding member 57, the shaft 51, and the main body frame 101.

As shown in FIG. 4, the shaft 51 is fitted with a first light-shielding plate 51*a* that, by shielding a sensing portion of a first position sensor S1 (see FIG. 11) from light, makes it possible to sense the rotation angle of the shaft 51. As shown in FIG. 7, on one side face of the roller holder 47 in the rotation direction, a second light-shielding plate 47*d* is formed. The second light-shielding plate 47*d* is formed at a position where it can shield from light a sensing portion of a second position sensor S2 (see FIG. 11) arranged on the unit frame 9*a*.

The first and second light-shielding plates 51*a* and the 47*d* turn on and off the first and second position sensors S1 and S2 respectively in accordance with the rotation angle of the roller holder 47 (shaft 51), and this makes it possible to sense the position of the first and second rollers 40 and 41 supported on the roller holder 47. The control for sensing the position of the first and second rollers 40 and 41 will be described later.

As shown in FIG. 8, the first and second bearing members 43 and 45 respectively have a first bearing portion 43*b* and a second bearing portion 45*b*, both arc-shaped, which hold the metal shafts 40*a* and 41*a* of the first and second rollers 40 and 41 respectively. On top parts of the first and second bearing portions 43*b* and 45*b*, restriction members 58 which restrict upward movement of the metal shafts 40*a* and 41*a* are attached. On tip ends of the metal shafts 40*a* and 41*a*, caps 59 are attached. The caps 59 prevent the shafts 40*a* and 41*a* from coming off the first and second bearing portions 43*b* and 45*b*.

The first and second bearing members 43 and 45 are held respectively by the first and second bearing holding portions 47*a* and 47*b* of the roller holder 47 with a predetermined margin (clearance) in the left-right direction (the rotation direction of the roller holder 47).

A pair of switching cams 50 are arranged in opposite end parts of the first and second rollers 40 and 41 in the axial direction, outward of the roller holders 47. The switching cam 50 is in a fan shape as seen in a side view, with the hinge portion of the fan (near the vertex at which two radial lines intersect) fastened to the shaft 51. To the shaft 51, a parallel pin 51*b* extending in the radial direction is fastened. In the switching cam 50, a pin insertion portion 65 for inserting the parallel pin 51*b* is formed. The parallel pin 51*b* is inserted in the pin insertion portion 65 with no gap in the circumferential direction of the shaft 51.

Inward of the switching cam 50 in the axial direction, an arc-shaped guide hole 63 (see FIG. 12) is formed. A recessed portion 64 (see FIG. 12) is formed in the middle of an outer circumferential edge part of the guide hole 63 in the radial direction. The first and second bearing members 43 and 45 respectively have a first engaging portion 43*a* and a second engaging portion 45*a* formed on them that engage with the guide hole 63.

Engaging the first engaging portion 43*a* with a recessed portion 64 results in the first bearing member 43 to be pressed by the first coil spring 48 to move in the direction away from the shaft 51. As a result, the first roller 40 is brought into pressed contact with the tension roller 11 via the intermediate transfer belt 8. Engaging the second engaging portion 45*a* with the recessed portion 64 results in the second bearing member 45 to be pressed by the second coil spring 49 to move in the direction away from the shaft 51. As a result, the second roller 41 is brought into pressed contact with the tension roller 11 via the intermediate transfer belt 8. In this way, the positions of the first and second bearing members 43 and 45 in the rotation direction of the roller holder 47 are determined.

As described above, the first and second bearing members 43 and 45 are held respectively by the first and second bearing holding portions 47*a* and 47*b* of the roller holder 47 with a predetermined margin (clearance). Here, the positional relationship of the switching cam 50 with the shaft 51 is maintained by the parallel pin 51*b*. The positional relationship of the switching cam 50 with the first and second rollers 40 and 41 is maintained by engagement of the first and second engaging portions 43*a* and 45*b* with the recessed portion 64 of the switching cam 50.

Figure 13:
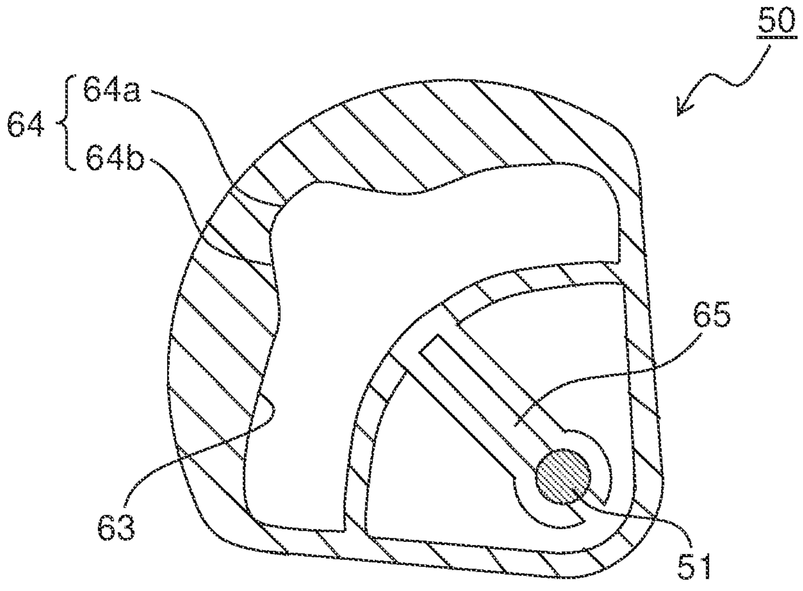
FIG. 13 is a plan view of the switching cam as seen from inward in the axial direction.

As shown in FIG. 13, which will be described later, the pin insertion portion 65 of the switching cam 50 is formed along a straight line through the shaft 51 and the recessed portion 64. That is, when the first and second engaging portions 43*a* and 45*b* engage with the recessed portion 64, the first and second rollers 40 and 41 are positioned in the extension direction of the parallel pin 51*b*.

As shown in FIG. 9, the shaft 51 is coupled to the roller switching motor 55 via gears 52 and 53. Rotating the switching cam 50 together with the shaft 51 permits the arrangement of the first and second rollers 40 and 41 to be switched. The control for switching between the first and second rollers 40 and 41 will be described later.

Figure 10:
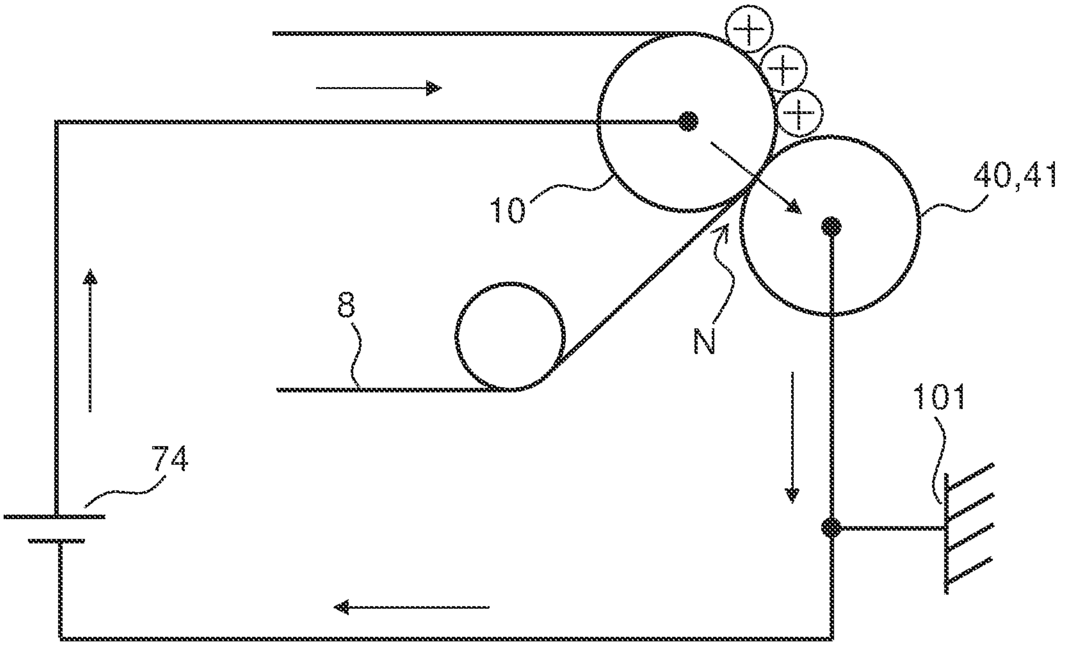
FIG. 10 is a circuit diagram illustrating the flow of a secondary transfer current at a secondary transfer nip.

FIG. 10 is a circuit diagram illustrating the flow of a secondary transfer current at the secondary transfer nip N. As shown in FIG. 10, the driving roller 10 is electrically connected to the positive terminal of a transfer voltage power supply 74. The first and second rollers 40 and 41 are, in a state arranged opposite the driving roller 10, electrically connected to the positive terminal of the transfer voltage power supply 74.

When a secondary transfer voltage of the same polarity (here, positive) as that of toner is applied from the transfer voltage power supply 74 to the driving roller 10, a secondary transfer current flows from the driving roller 10 to the first or second rollers 40 or 41 via the intermediate transfer belt 8. Thus, a predetermined secondary transfer electric field is produced at the secondary transfer nip N and the toner image that has been primarily transferred to the intermediate transfer belt 8 is secondarily transferred to the sheet S passing through the secondary transfer nip N.

As described above, the first and second rollers 40 and 41 are always grounded (earthed) via the first grounding members 56*a*, 56*b* and the second grounding member 57. Thus, part of the secondary transfer current flowing through the first or second roller 40 or 41 flows to the main body frame 101. Even so, not all the secondary transfer current flows to the main body frame 101, and thus secondary transfer performance is unlikely to be affected even with the first and second rollers 40 and 41 always grounded.

In this embodiment, the secondary transfer electric field is produced at the secondary transfer nip N by application to the driving roller 10 of the secondary transfer voltage of the same polarity (here, positive) as that of toner; it is however also possible to produce the secondary transfer electric field at the secondary transfer nip N by applying to the first and second rollers 40 and 41 a secondary transfer voltage of the polarity (here, negative) opposite to that of toner. Also in that case, the secondary transfer current flows in the same direction as in FIG. 10; thus, although part of the secondary transfer current flows to the main body frame 101, secondary transfer performance is unlikely to be affected.

Figure 11:
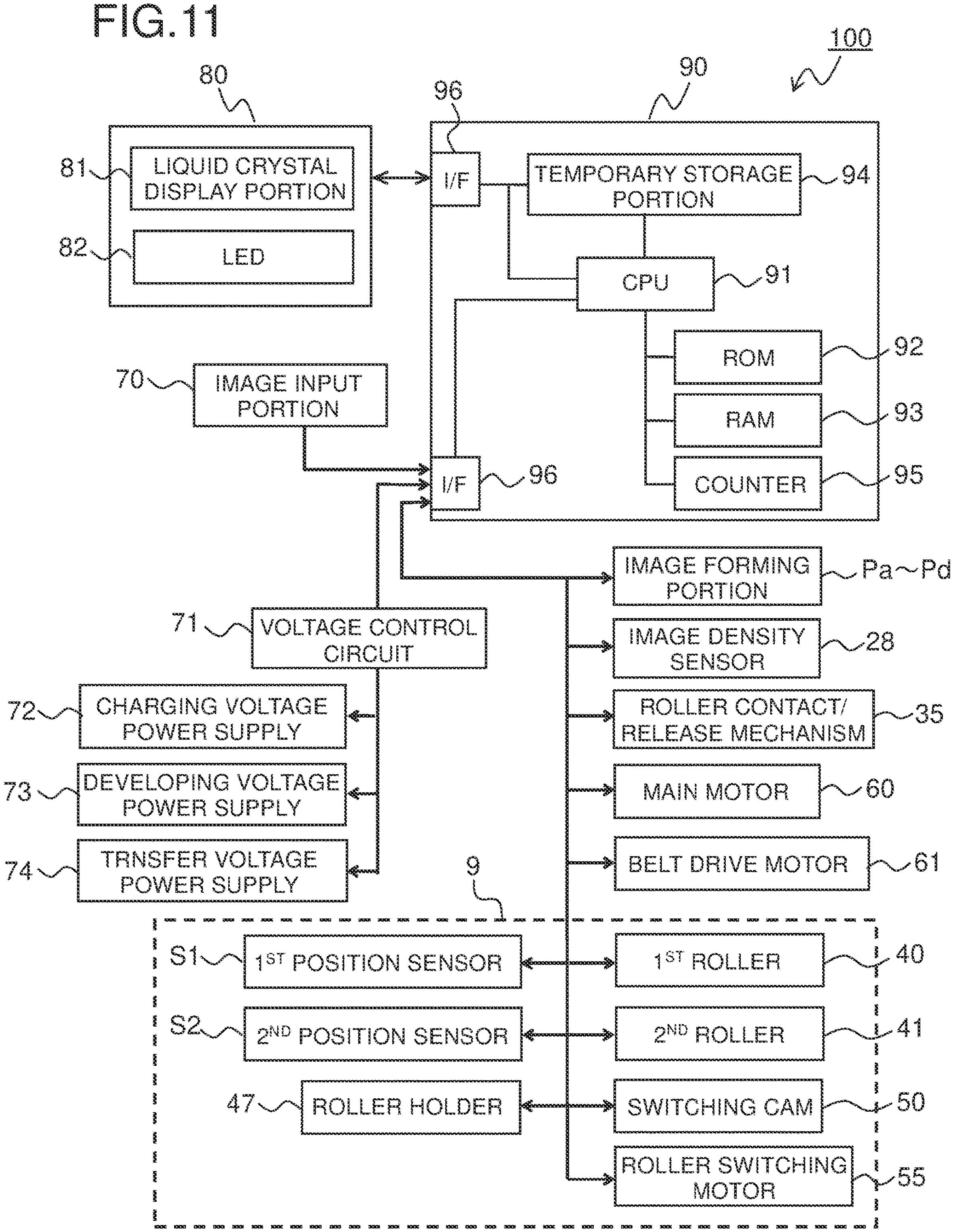
FIG. 11 is a block diagram showing one example of the control paths in the image forming apparatus mounted with the secondary transfer unit according to the embodiment.

FIG. 11 is a block diagram showing one example of the control paths in the image forming apparatus 100 mounted with the secondary transfer unit 9 according to the embodiment. In actual use of the image forming apparatus 100, different parts of it are controlled in different ways across complicated control paths all over the image forming apparatus 100. To avoid complexity, the following description focuses on those control paths which are necessary for implementing the present disclosure.

The control portion 90 includes at least a CPU (central processing unit) 91 as a central arithmetic processor, a ROM (read-only memory) 92 as a read-only storage portion, a RAM (random-access memory) 93 as a readable/writable storage portion, a temporary storage portion 94 that temporarily stores image data or the like, a counter 95, and a plurality of (here, two) I/Fs (interfaces) 96 that transmit control signals to different devices in the image forming apparatus 100 and receive input signals from an operation section 80. Furthermore, the control portion 90 can be arranged at any location inside the main body of the image forming apparatus 100.

The ROM 92 stores data and the like that are not changed during use of the image forming apparatus 100, such as control programs for the image forming apparatus 100 and numerical values required for control. The RAM 93 stores necessary data generated in the course of controlling the image forming apparatus 100, data temporarily required for control of the image forming apparatus 100, and the like. Furthermore, the RAM 93 (or the ROM 92) also stores a density correction table used in calibration, and the like. The counter 95 counts the number of sheets printed in a cumulative manner.

The control portion 90 transmits control signals to different parts and devices in the image forming apparatus 100 from the CPU 91 through the I/F 96. From the different parts and devices, signals that indicate their statuses and input signals are transmitted through the I/F 96 to the CPU 91. Examples of the various portions and devices controlled by the control portion 90 include the image forming portions Pa to Pd, the exposure device 5, the primary transfer rollers 6*a* to 6*d*, the secondary transfer unit 9, the roller contact/release mechanism 35, the main motor 60, the belt drive motor 61, a voltage control circuit 71, and the operation section 80.

An image input portion 70 is a receiving portion that receives image data transmitted from a host apparatus such as a personal computer to the image forming apparatus 100. An image signal inputted from the image input portion 70 is converted into a digital signal, which then is fed out to the temporary storage portion 94.

The voltage control circuit 71 is connected to a charging voltage power supply 72, a developing voltage power supply 73, a transfer voltage power supply 74, and a cleaning voltage power supply 75 and operates these power supplies in accordance with output signals from the control portion 90. In response to control signals from the voltage control circuit 71, the charging voltage power supply 72 applies a predetermined charging voltage to the charging rollers 25 in the charging devices 2*a* to 2*d*, the developing voltage power supply 73 applies a predetermined developing voltage to the developing rollers 22 in the developing devices 3*a* to 3*d*, and the transfer voltage power supply 74 applies a predetermined primary transfer voltage to the primary transfer rollers 6*a* to 6*d*. The transfer voltage power supply 74 applies a predetermined secondary transfer voltage to the driving roller 10.

The operation section 80 includes a liquid crystal display portion 81 and LEDs 82 that indicate various statuses. A user operates a stop/clear button on the operation section 80 to stop image formation and operates a reset button on it to bring various settings for the image forming apparatus 100 to default ones. The liquid crystal display portion 81 indicates the status of the image forming apparatus 100 and displays the progress of image formation and the number of copies printed. Various settings for the image forming apparatus 100 are made via a printer driver on a personal computer.

Figure 12:
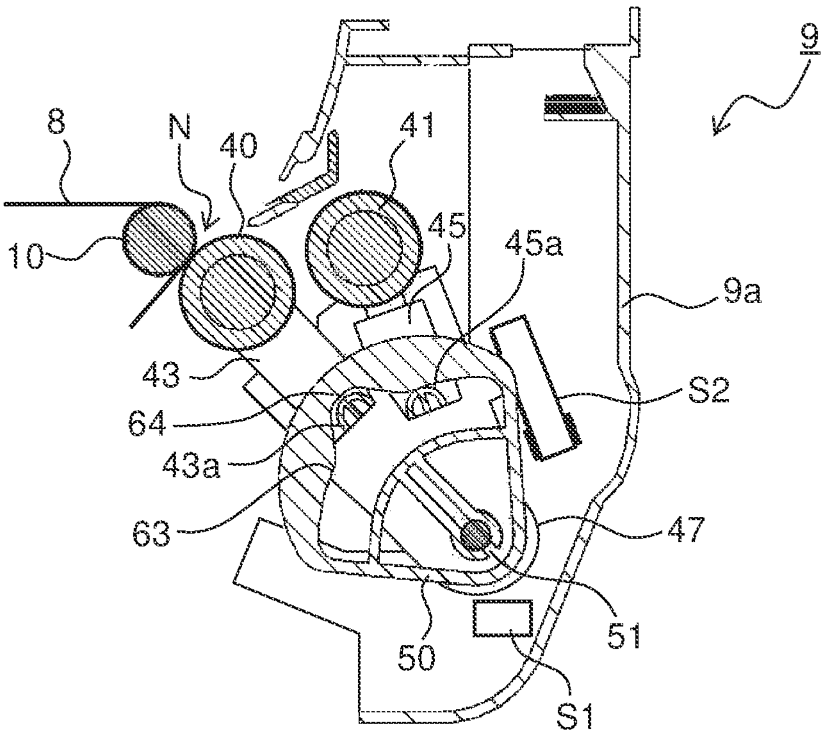
FIG. 12 is a cross-sectional side view of and around the secondary transfer unit including a switching cam according to the embodiment, illustrating a state where the first roller is arranged at a reference position where it forms the secondary transfer nip.

Next, a description will be given of switching control and position sensing control for the first and second rollers 40 and 41 in the secondary transfer unit 9 according to the embodiment. FIG. 12 is a cross-sectional side view of and around the secondary transfer unit 9 including the switching cam 50 according to the embodiment, illustrating a state where the first roller 40 is arranged at a position where it forms the secondary transfer nip N. FIG. 13 is a plan view of the switching cam 50 as seen from inward in the axial direction.

As shown in FIG. 13, the recessed portion 64 of the switching cam 50 is in a trapezoid shape as seen in a plan view and has a bottom portion 64*a* corresponding to the upper side of the trapezoid and inclined portions 64*b* corresponding to the hypotenuses of the trapezoid. As the switching cam 50 rotates, the first engaging portion 43*a* of the first bearing member 43 and the second engaging portion 45*a* of the second bearing member 45 either engage with the bottom portion 64*a* or the inclined portions 64*b* of the recessed portion 64, or lie away from the recessed portion 64, thereby allowing the state of contact of the first and second rollers 40 and 41 with respect to the intermediate transfer belt 8 to be switched as will be described later.

In the state in FIG. 12, the first engaging portion 43*a* of the first bearing member 43 engages with the bottom portion 64*a* of the recessed portion 64. Thus, under the urging force of the first coil spring 48 (see FIG. 5), the first roller 40 is kept in pressed contact with the driving roller 10 via the intermediate transfer belt 8 to form the secondary transfer nip N, and the first roller 40 rotates by following the driving roller 10. Through the first roller 40, a predetermined secondary transfer current is passed by the transfer voltage power supply 74 (see FIG. 11). Specifically, when the first roller 40 is arranged at the position in FIG. 12, the transfer voltage of the same polarity (here, positive) as that of toner is applied to the driving roller 10 electrically connected to the transfer voltage power supply 74 and the secondary transfer current flows through the first roller 40 via the intermediate transfer belt 8.

The first light-shielding plate 51*a* (see FIG. 4) on the shaft 51 shields light from the sensing portion of the first position sensor S1 (on), and the second light-shielding plate 47*d* on the roller holder 47 shields light from the sensing portion of the second position sensor S2 (on). This state (S1/S2 on) is taken as the reference position (home position) of the first roller 40. By restricting the rotation angle of the switching cam 50 based on the rotation time of the switching cam 50 from this reference position, the arrangement and the released state of the first roller 40 are controlled.

Figure 14:
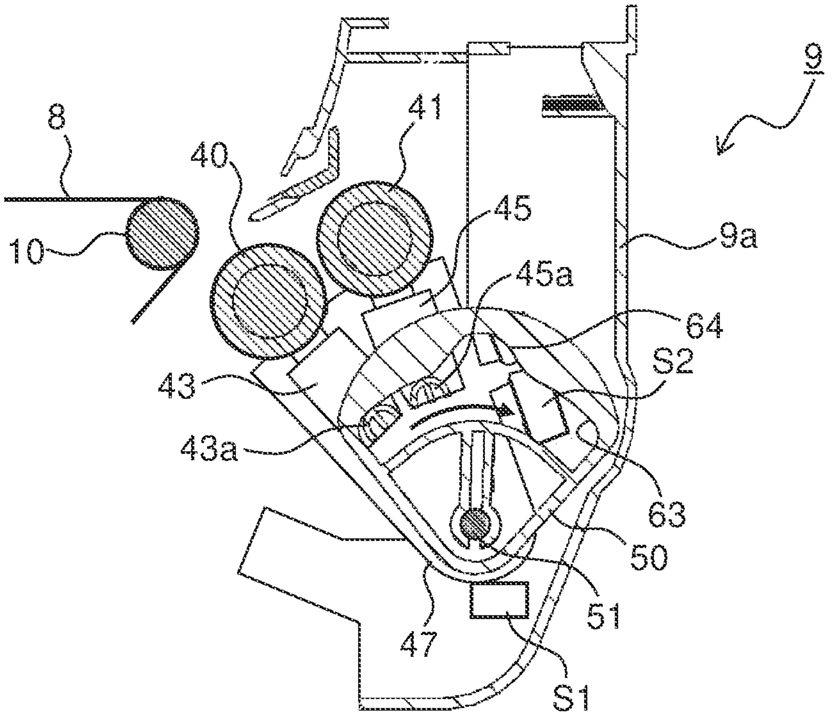
FIG. 14 is a diagram showing a released state of the first roller, where the switching cam has been rotated clockwise from the state in FIG. 12 through a predetermined angle.

FIG. 14 is a diagram showing a state where the switching cam 50 has been rotated clockwise from the state in FIG. 12 through a predetermined angle (here, 46.4° from the reference position in FIG. 12). When the shaft 51 is further rotated clockwise, the switching cam 50 also further rotates clockwise along with the shaft 51. On the other hand, the roller holder 47 is restrained from clockwise rotation by the restriction rib 9*b* (see FIG. 5). As a result, the first engaging portion 43*a* of the first bearing member 43 moves from the recessed portion 64, and the first bearing member 43 moves in the direction toward the shaft 51 against the urging force of the first coil spring 48 (see FIG. 5). Thus, the first roller 40 lies away from the intermediate transfer belt 8 (released state). The sensing state of the first and the second position sensors S1 and S2 in FIG. 14 is S1 off/S2 on.

When the shaft 51 is rotated counter-clockwise from the state shown in FIG. 14, the switching cam 50 rotates counter-clockwise along with the shaft 51. On the other hand, the first and second bearing members 43 and 45 are urged in the direction away from the shaft 51 under the urging forces of the first and second coil springs 48 and 49 (see FIG. 5 for both) respectively. Thus, the first and second engaging portions 43*a* and 45*a* are pressed against an outer circumferential edge part of the guide hole 63 in the switching cam 50 in the radial direction. Thus, the roller holder 47 rotates counter-clockwise along with the switching cam 50.

Figure 15:
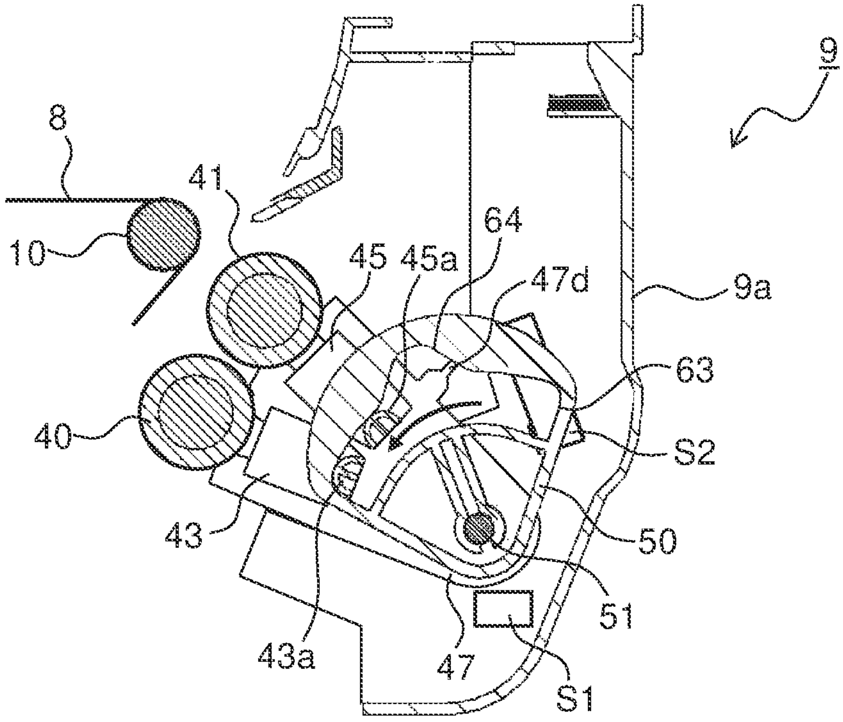
FIG. 15 is a diagram showing a state where the shaft has been rotated counter-clockwise from the state in FIG. 14 such that the second roller is arranged at a position opposite the driving roller.

When the roller holder 47 rotates until it makes contact with the restriction rib 9*c* (see FIG. 5), as shown in FIG. 15, the second roller 41 is arranged at a position opposite the driving roller 10. In the state in FIG. 15, the first light-shielding plate 51*a* on the shaft 51 is retracted from the sensing portion of the first position sensor S1 (off), and the second light-shielding plate 47*d* on the roller holder 47 is retracted from the sensing portion of the second position sensor S2 (off). That is, when the sensing state changes from the one in FIG. 14 (S1 off/S2 on) to the one in FIG. 15 (S1/S2 off), the second roller 41 can be sensed to have moved to the position opposite the driving roller 10.

Figure 16:
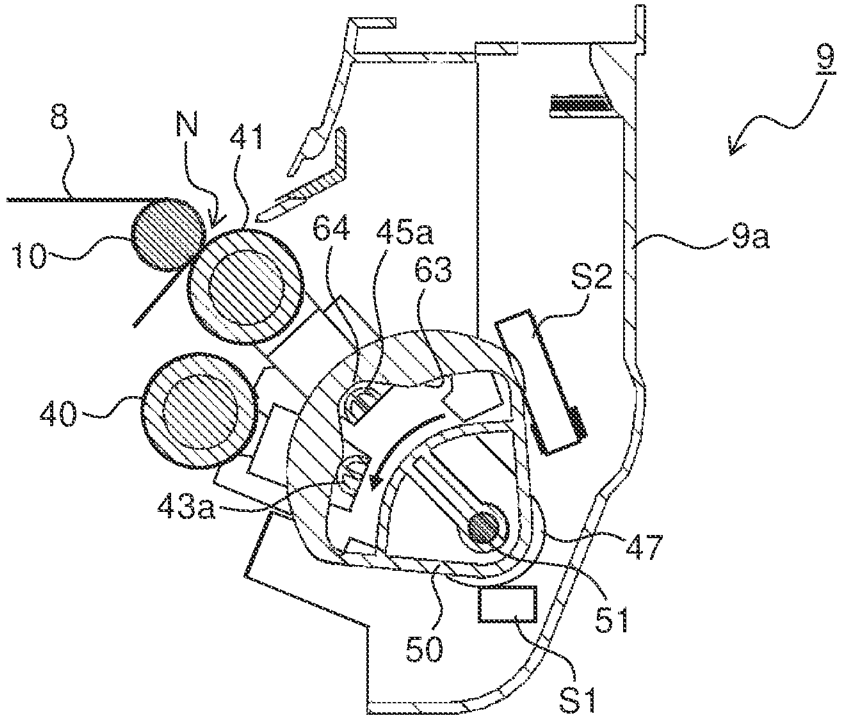
FIG. 16 is a diagram showing a state where the switching cam has been rotated counter-clockwise from the state in FIG. 15 through a predetermined angle such that the second roller is arranged at a reference position where it forms the secondary transfer nip.

FIG. 16 is a diagram showing a state where the switching cam 50 has been rotated counter-clockwise from the state in FIG. 15 through a predetermined angle. When the shaft 51 is rotated counter-clockwise, the switching cam 50 rotates along with the shaft 51. On the other hand, the roller holder 47 is restrained from counter-clockwise rotation by the restriction rib 9*c* (see FIG. 5). As a result, the second engaging portion 45*a* of the second bearing member 45 moves to the bottom portion 64*a* of the recessed portion 64, and the second bearing member 45 moves in the direction away from the shaft 51 under the urging force of the second coil spring 49 (see FIG. 5).

As a result, the second roller 41 is kept in pressed contact with the driving roller 10 via the intermediate transfer belt 8 to form the secondary transfer nip N and rotates by following the driving roller 10. Through the second roller 41, a predetermined secondary transfer current is passed by the transfer voltage power supply 74 (see FIG. 11). Specifically, when the second roller 41 is arranged at the position in FIG. 16, the transfer voltage of the same polarity (here, positive) as that of toner is applied to the driving roller 10 electrically connected to the transfer voltage power supply 74 and the secondary transfer current flows through the second roller 41 via the intermediate transfer belt 8.

The first light-shielding plate 51*a* on the shaft 51 shields light from the sensing portion of the first position sensor S1 (on), and the second light-shielding plate 47*d* on the roller holder 47 is retracted from the sensing portion of the second position sensor S2 (off). This state (S1 on/S2 off) is taken as the reference position (home position) of the second roller 41. That is, when the sensed state changes from the one in FIG. 15 (S1/S2 off) to the one in FIG. 16 (S1 on/S2 off), the second roller 41 can be sensed to have moved to the reference position. By restricting the rotation angle of the switching cam 50 based on the rotation time of the switching cam 50 from this reference position, the arrangement and the released state of the second roller 41 are controlled.

Figure 17:
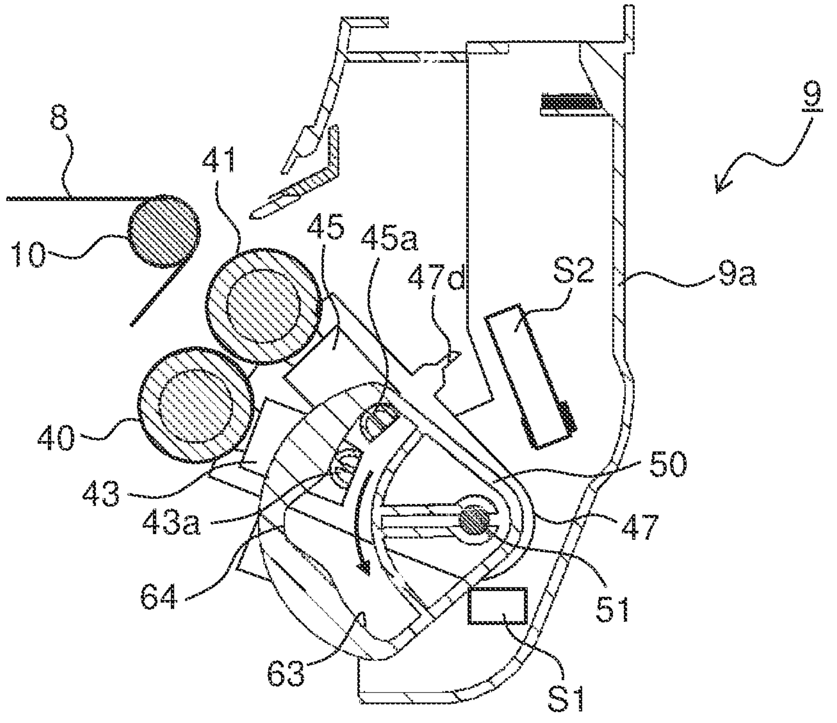
FIG. 17 is a diagram showing a released state of the second roller, where the switching cam has been rotated further counter-clockwise from the state in FIG. 16 through a predetermined angle.

FIG. 17 is a diagram showing a state where the switching cam 50 has been rotated counter-clockwise from the state in FIG. 16 through a predetermined angle (here, 46.4° from the reference position in FIG. 16). When the shaft 51 is rotated further counter-clockwise, the switching cam 50 rotates along with the shaft 51. On the other hand, the roller holder 47 is restrained from counter-clockwise rotation by the restriction rib 9*c* (see FIG. 5). As a result, the second engaging portion 45*a* of the second bearing member 45 moves from the recessed portion 64 and the second bearing member 45 moves in the direction toward the shaft 51 against the urging force of the second coil spring 49 (see FIG. 5). Thus, the second roller 41 lies away from the intermediate transfer belt 8 (released state). The sensing state of the first and the second position sensors S1 and S2 in FIG. 17 is S1/S2 off.

Figure 18:
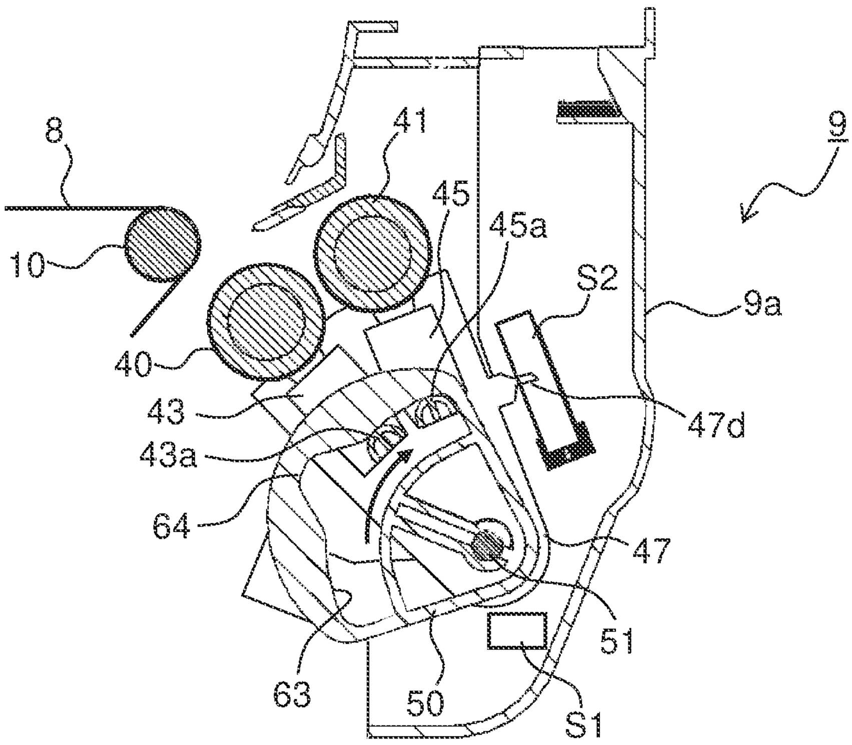
FIG. 18 is a diagram showing a state where the switching cam has been rotated clockwise from the state in FIG. 17 through a predetermined angle such that the first roller is arranged at a position opposite the driving roller.

When the roller that forms the secondary transfer nip N is switched from the second roller 41 to the first roller 40, the switching cam 50 is rotated from the state in FIG. 17 clockwise through a predetermined angle. As a result, the roller holder 47 rotates clockwise along with the switching cam 50 through the predetermined angle. When the roller holder 47 rotates until it makes contact with the restriction rib 9*b*, the first roller 40 goes into the state shown in FIG. 18 where the first roller 40 faces the driving roller 10. When the switching cam 50 is rotated further from the state in FIG. 18 clockwise through a predetermined angle, the first roller 40 goes into the state shown in FIG. 12 where the first roller 40 is arranged at the reference position. Through repetition of the procedure described above, switching between the first and second rollers 40 and 41 is achieved.

With the configuration according to the embodiment, with a simple configuration using the roller holder 47 and the switching cam 50, one of the first and second rollers 40 and 41 is arranged opposite the driving roller 10 and, the first or second roller 40 or 41 arranged opposite the driving roller 10 can be arranged either at a reference position at which the first or second roller 40 or 41 forms the secondary transfer nip N or at a released position at which the first or second roller 40 or 41 lies away from the intermediate transfer belt 8.

For example, if the sheet S is equal to or smaller than a predetermined size (here, A3-size), the first roller 40 having the elastic layer 40*b* with a smaller length in the axial direction is arranged at the reference position. Then, when calibration is performed during image formation in which reference images are formed on the intermediate transfer belt 8 outside the image area in the width direction (outward of the first roller 40 in the axial direction), the reference images formed on the intermediate transfer belt 8 do not make contact with the first roller 40. Thus, calibration can be performed during image formation, and this helps improve image quality without a drop in image processing efficiency (productivity).

It is also possible to effectively suppress staining on the rear surface of the sheet S due to toner deposited on the first roller 40 adhering the sheet S. Furthermore, it is not necessary to perform cleaning operation to move the toner deposited on the first roller 40 back to the intermediate transfer belt 8, and this helps reduce printing wait time.

By contrast, if the sheet S is equal to or larger than the predetermined size (here, 13 inch-size), the second roller 41 having the elastic layer 41*b* with a larger length in the axial direction is arranged at the reference position. Then, it is possible to ensure that the toner image is secondarily transferred to opposite edge parts of the large-size sheet S in the width direction.

The first and second rollers 40 and 41 are always grounded (earthed) via the first grounding members 56*a*, 56*b* and the second grounding member 57. Thus, after secondary transfer, the transfer electric field does not remain on the first and second rollers 40 and 41. It is thus possible to always apply the appropriate transfer electric field to the secondary transfer nip N, and thereby to stably obtain a good transferred image.

The first and second bearing members 43 and 45 are held respectively by the first and second bearing holding portions 47*a* and 47*b* of the roller holder 47 with a predetermined margin (clearance). This makes it easy to mount the first and second bearing members 43 and 45 on the roller holder 47 and helps improve the assembling workability of the secondary transfer unit 9.

When the first and second engaging portions 43*a* and 45*b* engage with the recessed portion 64, the first and second rollers 40 and 41 are positioned in the extension direction of the parallel pin 51*b*. Thus, even when the first and second bearing members 43 and 45 are not positioned in the first and second bearing holding portions 47*a* and 47*b*, the first and second rollers 40 and 41 are accurately positioned with respect to the driving roller 10 and this helps stably form the secondary transfer nip N.

Furthermore, in this embodiment, it is possible to drive the roller holder 47 and the switching cam 50 with the single roller switching motor 55. Thus, compared to a configuration where the roller holder 47 and the switching cam 50 are driven with separate motors, the driving mechanism and the driving control can be simplified, and this helps reduce the cost and the size of the image forming apparatus 100.

The embodiment described above is in no way meant to limit the present disclosure, which thus allows for many modifications and variations within the spirit of the present disclosure. For example, the shapes and the dimensions of the first roller 40, the second roller 41, the roller holder 47, the switching cam 50 that constitute the secondary transfer unit 9 are merely examples and can be freely modified without spoiling the effect of the present disclosure.

The above embodiment deals with a configuration that includes two secondary transfer rollers comprising a first and a second roller 40 and 41 having elastic layers 40*b* and 41*b* with different axial lengths and where one of the first and second rollers 40 and 41 is arranged at a reference position in accordance with size information on a sheet S. Instead, a configuration is also possible that includes two secondary transfer rollers comprising a first and a second roller 40 and 41 having elastic layers 40*b* and 41*b* with different volume resistivities or different hardnesses and where one of the first and second rollers 40 and 41 is arranged at a reference position in accordance with information on a property of the sheet S (such as resistance value, thickness, basis weight, or surface smoothness).

Although the above embodiment deals with, as an example, an intermediate transfer-type image forming apparatus 100 provided with a secondary transfer unit 9 by which a toner image that has been primarily transferred to an intermediate transfer belt 8 is secondarily transferred to a sheet S, what is disclosed herein is applicable similarly to transfer units mounted on a direct transfer-type image forming apparatus in which a toner image formed on a photosensitive drum is directly transferred to a sheet.

The present disclosure is applicable to an image forming apparatus provided with a transfer unit for transferring a toner image formed on an image carrying member to a recording medium. Based on the present disclosure, it is possible to provide a transfer unit that can stably form a high-quality image by grounding two transfer rollers to be selectively pressed into contact with the image carrying member, as well as to provide an image forming apparatus incorporating such a transfer unit.

What is claimed is:

1. A transfer unit that transfers a toner image formed on an image carrying member to a recording medium as the recording medium passes through a transfer nip, the transfer unit comprising:

a transfer roller including a metal shaft and an elastic layer laid around an outer circumferential face of the metal shaft, the transfer roller forming the transfer nip by keeping the elastic layer in pressed contact with the image carrying member, the transfer roller including a first roller and a second roller, the first and second rollers differing in one of axial direction, volume resistivity, and hardness of the elastic layer;

a first bearing member that rotatably supports the metal shaft of the first roller;

a second bearing member that rotatably supports the metal shaft of the second roller;

a roller holder that has a first bearing holding portion and a second bearing holding portion that respectively hold the first and second bearing members slidably in directions toward and away from the image carrying member; and a switching mechanism that drives the roller holder to rotate such that one of the first and second rollers is arranged at a reference position at which the first or second roller is kept in pressed contact with the image carrying member to form the transfer nip, wherein the first and second bearing members have a grounding member that grounds the first and second rollers respectively.

2. The transfer unit according to claim 1, wherein the switching mechanism including a first coil spring arranged between the first bearing holding portion and the first bearing member, the first coil spring urging the first bearing member in a direction toward the image carrying member;

a second coil spring arranged between the second bearing holding portion and the second bearing member, the second coil spring urging the second bearing member in a direction toward the image carrying member;

a switching cam having a guide hole with which a first engaging portion formed on the first bearing member and a second engaging portion formed on the second bearing member engage;

a metal shaft fixed to a rotation center of the switching cam, the metal shaft rotatably supporting the roller holder; and a roller switching motor for rotating the shaft, wherein the shaft is grounded via a main body frame of an image forming apparatus in which the transfer unit is mounted, and the grounding member has a pair of first grounding members across which the metal shaft conducts to the first or second coil springs, and a second grounding member across which the first and second coil springs conducts to the shaft.

3. The transfer unit according to claim 2, wherein as a result of the roller holder being rotated, one of the first and second rollers is arranged opposite the image carrying member, and as a result of the switching cam being rotated to change positions at which the first and second engaging portions respectively engage with the guide hole, the first or second roller arranged opposite the image carrying member is arranged selectively either at the reference position or at a released position at which the first or second roller lies away from the image carrying member.

4. The transfer unit according to claim 3, wherein the switching cam has a recessed portion formed in an outer circumferential edge part of the guide hole in a radial direction, and, as a result of the first or second engaging portion being engaged with the recessed portion, the first or second roller arranged opposite the image carrying member is arranged at the reference position.

5. The transfer unit according to claim 4, wherein the first and second bearing members are held respectively by the first and second bearing holding portion of the roller holder with a predetermined margin in a rotation direction of the roller holder.

6. The transfer unit according to claim 5, wherein to the shaft, a parallel pin extending in a radial direction is fastened, and in the switching cam, a pin insertion portion for inserting the parallel pin is formed.

7. The transfer unit according to claim 6, wherein the parallel pin is inserted in the pin insertion portion with no gap in a circumferential direction of the shaft.

8. An image forming apparatus comprising:

a plurality of image forming portions that form toner images of different colors;

an endless intermediate transfer belt as an image carrying member, the intermediate transfer belt moving along the image forming portions;

a plurality of primary transfer members arranged, across the intermediate transfer belt, opposite photosensitive drums arranged respectively in the image forming portions, the primary transfer members primarily transferring the toner images formed on the photosensitive drums to the intermediate transfer belt; and a secondary transfer unit as the transfer unit according to claim 1, the secondary transfer unit secondarily transferring the toner images primarily transferred to the intermediate transfer belt to the recording medium.

* * * * *